(12) United States Patent
Pedersen

(10) Patent No.: US 7,203,342 B2
(45) Date of Patent: Apr. 10, 2007

(54) IMAGE FEATURE EXTRACTION

(75) Inventor: Stein Inge Pedersen, Stavanger (NO)

(73) Assignee: Schlumberger Technology Corporation, Ridgefield, CT (US)

( * ) Notice: Subject to any disclaimer, the term of this patent is extended or adjusted under 35 U.S.C. 154(b) by 592 days.

(21) Appl. No.: 10/081,603

(22) Filed: Feb. 21, 2002

(65) Prior Publication Data
US 2002/0126896 A1    Sep. 12, 2002

Related U.S. Application Data

(60) Provisional application No. 60/274,081, filed on Mar. 7, 2001.

(51) Int. Cl.
*G06K 9/00* (2006.01)

(52) U.S. Cl. .................... 382/109; 382/190; 702/14; 181/108; 367/14; 703/5

(58) Field of Classification Search ............... 382/109, 382/190, 193–195, 205–6, 128, 274–275, 382/206, 274–75; 702/14–15; 181/108; 367/14; 703/5
See application file for complete search history.

(56) References Cited

U.S. PATENT DOCUMENTS

| 5,859,891 | A  |   | 1/1999  | Hibbard ..................... 378/62 |
|-----------|----|---|---------|--------------------------------------|
| 5,990,973 | A  |   | 11/1999 | Sakamoto .................. 348/576 |
| 6,151,555 | A  |   | 11/2000 | Van Bemmel et al. ........ 702/14 |
| 6,289,126 | B1 | * | 9/2001  | Ishisaka .................... 382/205 |
| 6,577,757 | B1 | * | 6/2003  | DeYong et al. ............ 382/149 |
| 6,608,628 | B1 | * | 8/2003  | Ross et al. ................. 345/619 |
| 6,731,799 | B1 | * | 5/2004  | Sun et al. ................... 382/173 |
| 2001/0002315 | A1 | * | 5/2001 | Schultz et al. ............. 436/172 |

FOREIGN PATENT DOCUMENTS

| EP | 0 424 912 A2 | 5/1991 |
| WO | WO 99/64896 | 6/1999 |
| WO | WO 01/08098 A1 | 2/2001 |

OTHER PUBLICATIONS

Bonbeau, E. et al. "Swarm Smarts". *Scientific America*, pp. 57-59, (Mar. 2000).
Dorigo, M. et al. "Ant System: Optimization by a Colony of Cooperative Agents". *IEE Trans. on Systems, Man and Cybernetics*, Part B, vol. 26, No. 1, pp. 29-41, (1996).
Dorigo, M. et al. "Ant Colony System: A Cooperative Learning Approach to the Traveling Salesman Problem". *IEEE Trans. on Evolutionary Computation*, vol. 1, No. 1, pp. 53-66, (1997).
Russell, Stuart and Norvig, Peter *Artificial Intelligence, A Modern Approach*. Prentice Hall (1995).

* cited by examiner

*Primary Examiner*—Jingge Wu
*Assistant Examiner*—Shefali Patel
(74) *Attorney, Agent, or Firm*—William Batzer; Vincent P. Loccisano; Jody Lynn DeStefanis

(57) ABSTRACT

A method of extracting desired features from a cellular image including the steps of: (a) selecting an initial cell within the image; (b) selecting an additional cell, near the initial cell, appearing to be associated with a desired feature; (c) repeating step (b) for further cells, near at least one of the previously selected cells, appearing to be associated with said feature, until selection termination criteria are satisfied; and (d) repeating steps (a) through (c) for other initial cells. The method is particularly adept at extracting relatively weakly defined features in relatively noisy images, such as extracting faults or geologic horizons from 2D or 3D seismic data. A method of editing/filtering the features utilizing a stereo net is also disclosed. Related computer system and computer program products for implementing the method are also described.

29 Claims, 7 Drawing Sheets

FIG. 13
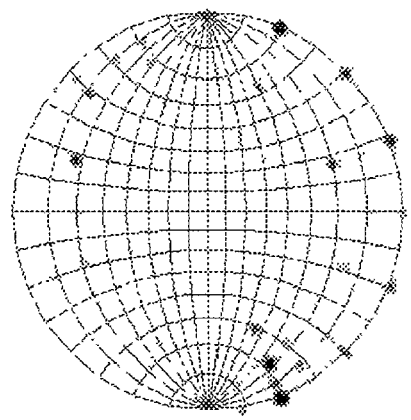
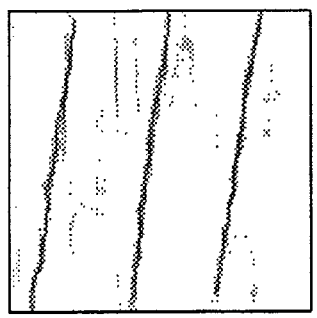
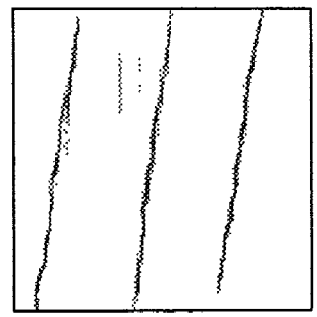
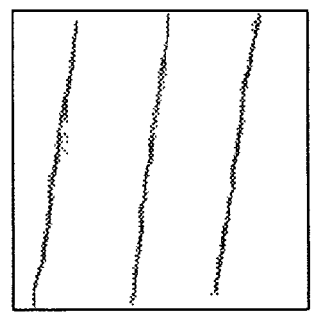
FIG. 14(a)  FIG. 14(b)  FIG. 14(c)

IMAGE FEATURE EXTRACTION

U.S. Provisional Application 60/274,081, filed 7 Mar. 2001.

BACKGROUND OF THE INVENTION

The present invention relates to a method of extracting desired features from a cellular image. This extraction method is particularly good at extracting relatively weakly defined features from relatively noisy images, such as faults or geologic horizons from 2D or 3D seismic data.

While the inventive method has been designed to extract faults from seismic attribute data, it is generally applicable to all kinds of line and surface extraction problems. Extraction of faults from attributes is nontrivial due to the characteristics of the data and the desire to extract intersecting faults as separate objects. This patent application shows how faults, which are often represented by poorly defined and weakly connected ridges, may be extracted by the cooperation of a swarm (typically thousands) of intelligent agents. Knowledge about the properties of a typical fault is encoded in the agents, and each agent is intended to extract a small segment of the fault. Each segment is stored as one object along with its inferred local properties. The faults are expected to be completely covered by the agents, and the extracted segments having comparable properties are then merged into complete faults. The use of thousands of agents searching for specific local properties from different starting points makes this a very robust approach, which can work under very difficult conditions. The approach is well suited for solving problems in applications where the desired structures are more trends than continuous ridges in a noisy environment.

Segmentation of ridgelines and surfaces in 2D and 3D data has many applications, and much work has been done within this field. Examples of heavily studied 2D applications are mapping of roads, railroads and rivers from high-resolution satellite images and analysis of blood cells in medical data. 3D surface and object reconstruction has applications in, for instance, extracting the bones in the skull from tomography and imaging of dental data. Many of the approaches developed to solve these kinds of tasks are designed to deal with the presence of noise in the images, but they nevertheless require that the extreme surfaces or lines comprise a "ridge" which is well defined and fairly continuous. They usually strive for generality, i.e. they make few or no assumptions on the shape of the surfaces/lines to be extracted.

The inventive method addresses the problem of extracting lines from 2D data and surfaces from 3D data in a rather "tough" environment. The following assumptions are made regarding the input data:

The extreme lines or surfaces often lack continuity and are weakly defined;

Making the extreme lines or surfaces more continuous by smoothing requires a large filter that will introduce unacceptable errors and mask desired details;

It is nontrivial to locally estimate the exact shape and extent of the entire line or surface;

Intersecting lines or surfaces are to be extracted as different objects;

Only structures having some expected properties are to be extracted, not other structures that may be present in the data; and The data has a high level of noise.

These assumptions represent poor conditions for a conventional line/surface extraction algorithm. In order to deal with the lack of continuity, the intersecting objects, the high noise level, and the presence of unwanted structures, the inventive method utilizes prior knowledge of which line or surface properties to look for. That is, a specialized algorithm is needed which extracts only the lines or surfaces exhibiting expected characteristics. Even though this patent application will focus on segmentation where knowledge about the desired structure is utilized, the method itself is general, and can be used on the same problems as conventional line and surface extraction algorithms.

It is an object of the present invention to provide an improved method of extracting desired features from a cellular image, and particularly a method for extracting relatively weakly defined features from relatively noisy images, such as faults or geologic horizons from 2D or 3D seismic data.

SUMMARY OF THE INVENTION

The present invention relates generally to the extraction of features from images and more particularly to a method of extracting desired features from a cellular image that includes the steps of: (a) selecting an initial cell within the image; (b) selecting an additional cell, near the initial cell, appearing to be associated with a desired feature; (c) repeating step (b) for further cells, near at least one of the previously selected cells, appearing to be associated with said feature, until selection termination criteria are satisfied; and (d) repeating steps (a) through (c) for other initial cells. The method is particularly adept at extracting relatively weakly defined features from relatively noisy images, such as extracting faults or geologic horizons from 2D or 3D seismic data. A related method of editing/filtering the features utilizing a stereo net is also disclosed. The invention further includes a computer system and computer program product for implementing the method. The invention and its benefits will be better understood with reference to the detailed description below and the accompanying drawings.

BRIEF DESCRIPTION OF THE DRAWINGS

FIG. 13 shows a stereo net with projected fault orientations; and

FIGS. 14(a), 14(b), and 14(c) show a section from an input 3D seismic data volume at various stages of stereo net filtering.

DETAILED DESCRIPTION OF THE INVENTION

Figure 1:
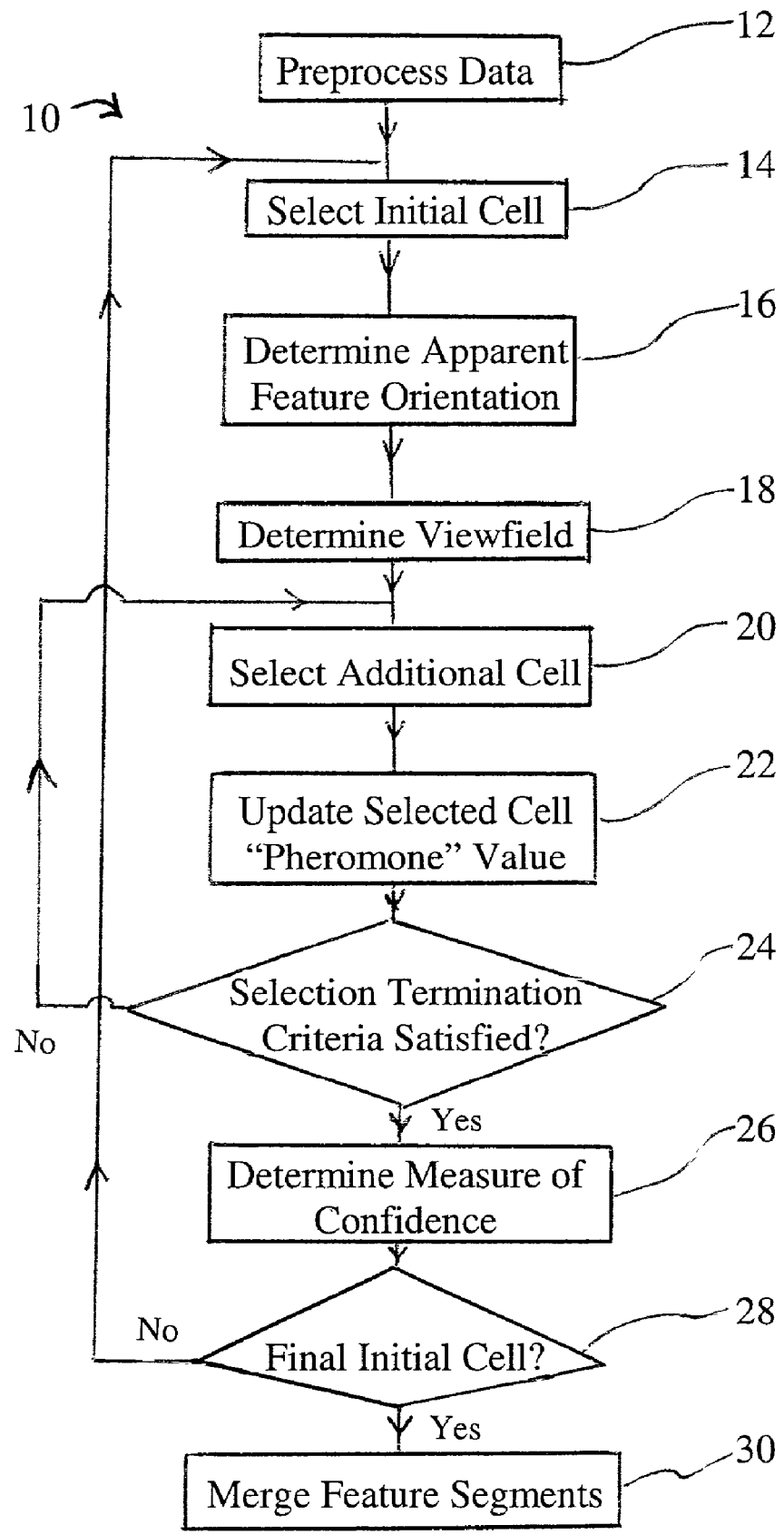
FIG. 1 is a process flow diagram illustrating an embodiment of the inventive method.

A general methodology is presented below for extracting lines in 2D and surfaces in 3D under the conditions stated above. This approach was originally developed to extract fault surfaces from attributes derived from 3D seismic data, and has done so with great success. This embodiment of the method will be used to concretise the generalized methodology described immediately below. Other applications where the method may also be utilized are described.

Overall Approach

In this section of the application, the overall approach of the methodology is presented. The foundation of the methodology is "swarm intelligence" that will be briefly introduced in the next section.

Swarm Intelligence

A colony of ants is often referred to as a "super organism". This term reflects the very successful organization of thousands of individual ants that make them perform the tasks needed for colony development. But how does the colony organize its ants into performing tasks like foraging, larvae transportation, defense, etc.? Each ant seems to have its own agenda, so how can the group as a whole appears to solve its tasks in an apparently intelligent and organized manner? The answer is in the individual ant's behavior. Each ant makes its own small decisions based on its natural behavior, and interaction between individuals result in co-operation that is largely self-organized. Even though the interaction between the ants may often be very simple, like one ant following the trail of another, together they can solve difficult problems. The collective behavior that emerges from a group of social insects is what is called "swarm intelligence".

The foraging behavior of ants has inspired new approaches for solving the travelling salesman problem as well as other optimization problems. See, for instance, E. Bonbeau, G. Theraulaz, "Swarm Smarts", *Scientific American*, March, 2000; M. Dorigo, V. Maniezzo, A. Colorni, "The Ant System: Optimization by a colony of cooperative agents", IEE Trans. on Systems, Man and Cybernetics, Part B, Vol. 26, No. 1, 1996; and M. Dorigo, L. M. Gambardella. "Ant Colony System: A Cooperative Learning Approach to the Travelling Salesman Problem", IEEE Trans. on Evolutionary Computation, Vol. 1, No. 1, 1997.

Ants find the shortest path between the nest and a food source by communicating via pheromone, a chemical substance that attracts other ants. Consider two ants starting at the same time from the nest, one choosing a longer path to the food source than the other does. Each ant marks its trail by emitting pheromone. The ant choosing the shorter path will return to the nest sooner than the other ant, and the shorter path will thus be marked with twice as much pheromone as the longer path. The next ant is thus more likely to choose the shorter path that has a stronger pheromone signature.

So how does this relate to extreme line and surface extraction? In this application, it will be shown how these lines and surfaces can be found by the behavior and interaction of intelligent agents. Earlier in this application, it was concluded that in order to overcome the challenges the relatively noisy data presents, prior knowledge of the desired feature needs to be taken into consideration. This knowledge is coded as the behavior of an intelligent agent. The agent will act very similar to an ant in the foraging situation described above, by making decisions based on its pre-coded behavior and emitting "electronic pheromone" along its trail. The idea is to distribute a number of agents in the 2D or 3D image and let each agent move along an extreme ridge while emitting pheromone as long as the ridge fulfills the criteria encoded in the agent. Agents which are deployed at a point where there is no extreme ridge, or where the ridge is poorly defined, will be terminated shortly or immediately after their deployment, whereas agents deployed at points on a well-defined ridge will be able to follow this ridge for a while before being terminated. It is assumed that a line or surface having the properties of the desired structures, which are captured in the prior knowledge, will be clearly marked by pheromone whereas non-extreme ridges, or extreme ridges not fulfilling the requirements will be unmarked or only weakly marked.

Agent Behavior

Russel and Norvig, in "Artificial Intelligence, A Modern Approach", Prentice Hall, 1995, define an agent as anything that can be viewed as perceiving its environment through sensors and acting upon that environment through effectors. A rational or intelligent agent is an agent that for each situation selects the action that maximizes its performance based on its perception and build-in knowledge. In this section, a method for encoding the characteristics of a structure into the behavior of an agent will be described in general terms.

Objective Function

So far, the inventive method has been described as a method for extracting extreme lines and surfaces, or more generally, extreme ridges from the data. It is now time to consider what these ridges represent. Clearly, there should be a correspondence between the amplitude and the importance or confidence of the various information in the data. This measure may be a static one, which is determined prior to processing the data, or it may change or depend on some initial conditions determined during processing. What is a local extreme or not, will be determined run-time within each agent. Upon choosing the next local maximum, the agent gives values to the pixels or voxels that are being considered by running them through an objective function. The objective function is one of two ways that prior knowledge is captured and the behavior of the agent is determined. If the goal of the method was to extract roads from a real or satellite images, the following properties could be encoded into the objective function:

The grey values of neighboring pixels, which are members of the road, are expected to be approximately the same;

The number of pixels describing the width of the road are expected to be approximately the same (although the road can be hidden by trees etc. for shorter periods); and Considering the scale of the image, the width of the road is expected to be within some limits.

From these properties, the following objective function can be constructed:

$$z(\text{pixel})=\omega_1\ chk\text{grey}(\text{pixel})+\omega_2\ chk\text{width}(\text{pixel})+\omega_3\ chk\text{maxwidth}(\text{pixel})+\omega_4\ \text{pheromone}(\text{pixel})$$

where pixel is the pixel that is currently being considered; the chkgrey, chkwidth and chkmaxwidth functions evaluate the properties listed above; and $\omega_i$ the weight of each function. The outputs of these sub-functions depend on the grey-value and width at the point where the agent is deployed. The last term in the function, pheromone(pixel), provides communication between the agents in terms of the "pheromone" trace each agent emits along its trace. This sub-function merely returns the total amount of pheromone emitted to this pixel from other agents, which will add to the function value. This way, pheromone left by an agent will affect what is considered a local maximum by other agents, and may thus attract other agents into choosing the same trace.

Of course, the input data may be of a form such that the important information already has high amplitude whereas other information has not, and there is no change in what is considered a local maximum. In such a case, the communication term need only be implemented if such communication is desired.

Stop Criterion

Given an input pixel or voxel, the objective function will return a value indicating to what extent this particular pixel or voxel seem to possess the desired feature properties. To complement this information, a function is needed to determine whether or not it is likely that a point is actually on a surface, considering the circumstances. A set of rules is defined, none of which may be broken in order for the method to consider this likely. These rules are combined into a function that is referred to as the selection termination criterion or the stop criterion. Rules which may be a part of the stop criterion can e.g. be that the point is required to be a local maximum, or within a certain distance from a local maximum, that the objective function value is above some threshold, etc. The agent will keep on moving along a maxima ridge as long as all of these rules are fulfilled. When one of the rules is broken, the stop criterion will be fulfilled and the agent terminated.

Agent movement

The objective function and the stop criterion give information about which points in space may be a member of the desired structure. Together they define the solution space, that is, they identify all the points that may be combined into "legal" solutions. Considering that the input data may be large and that both the objective function and the stop criterion may yield different values depending on the circumstances under which they are run, the number of possible solutions is obviously huge. Of course, an exhaustive combinatorial approach that creates all possible solutions and chooses the best of them, is out of the question. An intelligent way of navigating through the solution space, extracting only the best solutions, is needed. In the inventive method, this is done by incorporating knowledge of shape and orientation of the desired structure into the movement pattern of the agent. That is, the agent is only allowed to move in a manner that conforms to assumptions about which shape and orientation a correct solution should have. In this section of the application, a method for regulating the agent movement through something that is called the agent's "viewfield", is described.

The deployment of an agent in a local maximum may be considered as the birth of that agent. Its very first task is to look for something resembling a maxima ridge, and to estimate its orientation. As discussed above, it is desirable to limit the solution search and thus use prior knowledge about the shape and possible orientations of the structure to find a set of points that should be checked. If looking for lines in 2D space, are they coarsely vertical or horizontal? Is anything known regarding their slope? The agents can be considered as being like ants, and the set of checkpoints can be considered the agent's field of vision, or viewfield. It is important that the design of the viewfield covers all possibilities of a structure passing through the deployment point. At the same time, it should limit the possible solutions to a minimum.

Once an extreme ridge has been detected, and its orientation is estimated, the ridge tracing is started. That is, the agent chooses the point which is given the largest value in the objective function and which is approved by the stop criterion, and moves from its current point to this point. The path from its previous to the current point is marked with "pheromone". The viewfield which is used for this movement operation is a different viewfield than the one used for finding the orientation of the maxima ridge. As opposed to the orientation viewfield that has to cover all possible interesting ridges going through the seed point, the tracing viewfield will lock on to one ridge and make the agent follow that ridge for as long as it can. The viewfield must allow some deviation from the initial estimate, but this should be kept to a minimum.

If the viewfield allows the agent to deviate too much from its original course, it may easily be confused by overlapping structures or noise and lose track of the ridge it was initially following. Losing track due to too little flexibility will often terminate the agent because the acceptance criterion may no longer be fulfilled. Losing track due to too much flexibility is often more serious. The agent may jump off its current ridge to follow anther ridge, which it may be successful in doing for a longer or shorter distance. This way, the agent will erroneously link the two ridges and thus prevent separation between them. In order to avoid this, as much knowledge as possible about the natural variations and expected shape of the desired structure is encoded into the tracing viewfield. In general, the agent should be given too little rather than too much flexibility, thus limiting the agent's ability to follow the ridge. As long as sufficient agents are deployed in the image, the entire structure can be covered by different agents. Where one agent is terminated, another agent with a different starting point will probably be successful in covering the bit missed by the other agent.

Agent Design

As previously discussed, the inventive method is designed not only to locate extreme ridges within an image, but also to extract them as separate entities. This is why so much attention is paid to making an agent follow the same ridge all the time without getting confused by other ridges. In order to separate the structures, each agent has to keep track of the path followed when tracing a structure. The path will represent the segment of the structure extracted by the agent. Later, the extracted segments will be combined into complete structures. In order to do this, their properties will need to be compared. It may be important to keep the initial orientation estimate or other properties that may be derived from the segments. By implementing the agents as objects, this can be achieved. The agent class will have access to the objective function, the stop criterion, and the necessary viewfields. It also has storage for the points comprising the path followed during tracing and other useful information. The agent thus has access to the prior knowledge about the structures to be extracted and storage for the points extracted as a structure segment.

The power of this design may not be immediately obvious, except for the general programming convenience offered by object orientation. Having full control of every structure segment extracted from the data not only provides the information necessary to combine the segments into complete structures (which will be explicitly represented), it also enables the discrimination between the segments or the combined segments based on their particular properties. How this control enables the method to study separate fault systems derived from seismic data is described below. Each fault system corresponds to different ages in the geological history of the observed data, and being able to view these separately can provide the geologists with valuable information about the varying forces the area has been exposed to throughout time.

Agent Interaction

It has been shown above how the behavior of an agent is set by using our prior knowledge about the structure and that the agent will try its best to trace a single structure if it detects one. One cannot, however, rely on a single agent being able to extract the whole structure (unless the structure is very predictable), but only a small segment of it. Thus, in order to extract the structures in an image, the present method depends on the interaction of hundreds or thousands of such agents. One structure will, in other words, be extracted by the cooperation of several agents. But how can one be sure that agents cover the entire structure? Can the method rely on a trace left by an agent to really be a segment of a true structure? How do agents know that they are part of the same structure? These are the issues that will be focused on throughout this subsection.

Deployment

Can the method be sure that a structure within the image will be completely covered by agents? The answer to that will have to be no. Considering the assumption that one agent will only cover a small segment of the structure, to what degree the structure will be covered is obviously related to the number of agents deployed in the image. Of course, if the entire structure is visible in the image and agents are deployed in every single pixel or voxel in the image, the method would be certain to cover the entire structure, but this is neither realistic for typical data nor practical with respect to data size. In practice, a compromise must be made between coverage of the structures and computation time. The way that deployment is typically handled is by dividing the image into small cells in which the maximum values of the same objective function that is encoded within the agents, is found. These local maxima will serve as the deployment points of the agents. Of course the agents could be deployed randomly, but starting the agents off in local maxima provides the best conditions for the agents since the method is, after all, looking for ridges of local maxima. Taking the maximum values in the cells also ensure the strongest ridges to take precedence over the weaker ones.

Segment Merging

Assuming that each agent is only capable of extracting a small segment of the structure, segments will have to be merged in order to obtain the whole object. A determination will need to be made as to which segments to merge and how to cope with uncovered areas of the structure. It the structure is fully covered by pheromone, there will be overlapping segments, and the candidates for merging are obvious. There can be, however, overlapping segments belonging to different structures, and the segments will need to be evaluated to see if they have similar properties and thus decide whether or not they should be assigned to the same structure. The segments are compared based on the estimated properties stored within the agent object. For instance, in road mapping, a direction estimate of the road segment may exist. If the directions are overlapping and have approximately the same direction, it could be concluded that they are part of the same road and merge the two segments into one. If the segments are overlapping, but largely deviates in orientation (more than what would be natural for a winding), it could be concluded that this is a road crossing and thus treat the segments as being part of separate roads. Using the width of the road as a parameter may enable the separation between a highway and the smaller roads leading to it.

The entire structure may not always be covered by agent tracks. A road can e.g. for shorter periods be hidden by trees or pass through a tunnel, thus disappearing from the image. This will require a more complex merging algorithm that takes this into account. One way to solve this can be to look in the direction estimated from the last segment before the road disappears for a continuation within some maximum distance. The continuation will then be evaluated in the same manner as for the overlapping case, perhaps with some modifications taking the missing part into account.

Due to the restricted movement flexibility and potential slack in the stop criterion, the merged structure may not be as smooth or precise as one would wish. This could be solved by dividing the merged structure into small regions to which a higher order parametric line or surface to the segments is fit, fixing the endpoints to ensure continuity with the next region.

Structure Confidence

Deploying hundreds or thousands of agents across an image will most probably not result in only the true lines or surfaces being extracted. It is likely that some of the agents will detect structures that may locally be perceived as possessing the properties of the desired structure. The method thus needs to separate between what are called outliers, and the true structures. In other words, a measure of confidence needs to be attached to each extracted surface, indicating to what degree it can be trusted. Such a measure can be taken as one or as a composition of the following structure aspects:

Magnitude of pheromone track: If a structure is heavily marked by pheromone, it has been detected and successfully traced by many agents. This means that the structure is visible from many deployment points, and that it conforms to the expected properties encoded in the agents.

Average objective function value across the structure: The objective function provides a measure of how well a set of points fit to the expectations of the desired structure. Taking the average output from this function along the structure may give an indication of the credibility of the structure.

Size of structure: It is not very likely that something which isn't a structure of the kind being looked for will resemble such a structure for a longer period, provided that the method is successful in separating these structures from others. That is, large structures are held as probably being true, whereas the method is more skeptical with respect to smaller structures.

Variance of merged segments: The segments that are merged into a structure may each contain local properties reflecting the property estimate performed by each agent. If, for instance, the method is involved in road mapping, each segment may contain information about the grey level of the road in the picture and the width of the road. If the method is performing line or surface extraction, the normal may be such a parameter. The variance of such properties taken across all the segments merged into the structure, may provide a measure of the property agreement.

One embodiment of the inventive method is illustrated as a process flowchart in FIG. 1. Method steps 10 include a Preprocess Data step 12, a Select Initial Cell step 14, a Determine Apparent Feature Orientation step 16, a Determine Viewfield step 18, a Select Additional Cell step 20, an Update Selected Cell "Pheromone" Value step 22, a Selection Termination Criteria Satisfied decision block 24, a Determine Measure Of Confidence step 26, a Final Initial Cell decision block 28, and a Merge Feature Segments step 30.

Automatic Fault Interpretation

Having presented the overall approach, this application will now show how this method can be used to solve a practical problem in oil exploration. When exploring for oil, geologists look for structures in the earth where oil may have been trapped. If oil is aggregated in such a trap, it is called a reservoir. Oil is lighter than water, and a reservoir is not possible unless the oil is prevented from escaping by a layer of some impermeable rock. Due to tectonic forces (earthquakes), the layers of the earth are broken and shifted relative to one another. The surfaces along which the layers have shifted are called faults. Studying faults when exploring for oil is of great importance for geologists. By shifting impermeable layers, faults may create structural traps in which oil may have been trapped, or may have broken the sealing cap of an oil trap, so that the oil has leaked out. Faults are also important for the understanding of the flow in a reservoir. Faults may be sealing, thus blocking all flow between the compartments, or conducting, allowing communication between different compartments of the reservoir.

Performing this kind of interpretation of the subsurface requires some way of imaging it, and this is what is provided by a seismic survey. By emitting sound waves (caused by controlled explosions or vibrators) through the ground and recording their echoes, an image of the subsurface can be generated. On such an image, the geologists can map the faults by observing where a displacement between the reflection layers has taken place. In geological interpretation tools, mapping of faults is done manually by the interpreter. Due to huge amounts of data and subtle faults, manual fault interpretation is a tedious and difficult task. Automating this process would significantly reduce the interpretation time. This will have considerable economical ramifications in that the oilfield will be put into production faster. An objective is to automate this process so that interpretation is faster and also more accurate.

Two versions of the fault extraction algorithm have been developed, one operating on 2D images and the other operating in true 3D. They will both be described following the outline used above for describing the general approach. First, the data from which the faults will be extracted will be discussed.

Fault Attributes

Figure 9A:
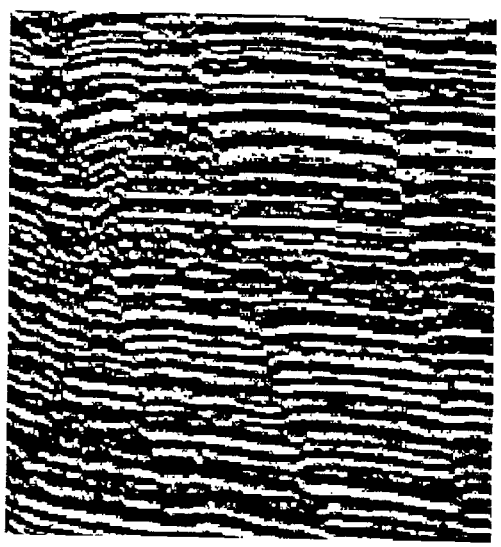
FIGS. 9(a), 9(b), and 9(c) show an input 2D seismic section, the seismic section after it has been filtered by an edge detection filter, and faults that have been extracted from the filtered seismic section by the inventive method.

An example of a seismic section is given FIG. 9(a). The faults can be seen where the reflection layers are broken and shifted. It is not easy to automatically extract the faults directly from this seismic section. To assist in the fault extraction process, the seismic data is pre-processed in order to highlight the faults and suppress the reflection layers. By utilizing an edge enhancement filter along the reflection layers, as proposed by T. Randen in PCT Patent Application No PCT/IB99/01040, "Automated Stratigraphic and Fault Interpretation", and P. Van Bemmel and R. Pepper in "Seismic signal processing method and apparatus for generating a cube of variance values", U.S. Pat. No. 6,151,555, the image in FIG. 9(b) may be obtained. As can be seen, the faults come forward as linear structures of high amplitudes. Subtle faults that are not obvious in the original image have also been highlighted. Data derived from seismic data by applying some method to it, is what is called an "attribute". Attributes may enhance features in the seismic data that are invisible or hard to detect, and provide valuable information to the interpreter. FIG. 9(a) is an example of an input seismic section and FIG. 9(b) is an example of an attribute generated by filtering along the reflection layers with an edge detection filter.

Figure 9B:
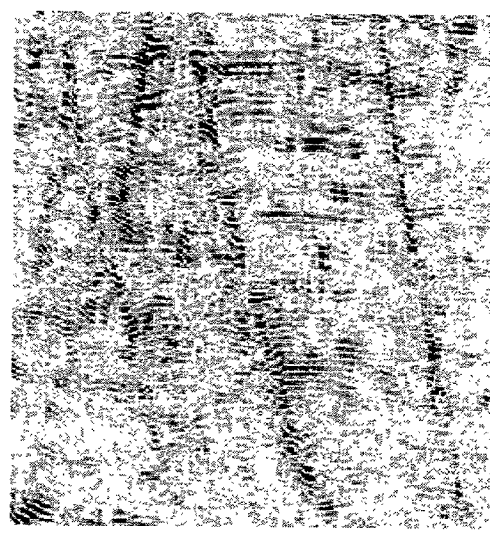

It is desired, however, to go one step further with the fault attribute in FIG. 9(b), and extract the faults from it as separate objects. The faults comprise maxima ridges, but are not easily extractable. The ridges are more like dotted lines than ridges, and lack continuity in between the dots. This corresponds to the first assumption regarding the data listed above, and in fact, all of the assumptions apply for this data. Connecting the dots in the attribute by smoothing would generally require the use a large filter. The intense areas which are not on faults would be smeared out and hence increase their sphere of bad influence on the agents. The assumptions of the presence of overlapping structures of the desired kind and unwanted structures are also fulfilled. There are faults that cross each other, and there are also remains of the reflection layers, comprising horizontal lines or surfaces in the data. It is impossible to locally predict the shape and extent of the fault. Estimating the slope of the fault locally would give very different approximations, which will only be a good representation for the fault for a short distance from the point the estimate was made. If any of the lines would be extended to the full extent of the fault, they would all be way off target. FIG. 9(b) also illustrates a general idea behind the inventive approach. Typically, good guesses cannot be made regarding the shape, the orientation and the extent of a fault, so instead of extracting it all in one go, it is extracted piecewise. The pieces are then combined into a complete representation of the fault. Generally the shape and extent of a fault cannot be predicted simply by examining local properties of it.

Objective Function

The data the agents will operate on are typically attribute images like the example shown in FIG. 9(b). Above, it was described how knowledge about the features the method wishes to enhance could be incorporated into the objective function. In this case, it is not necessary. The algorithms creating the attributes which will be used are designed to enhance the fault surfaces, and the data is thus already on the desired form with faults as maxima ridges. It is desired, however, to allow communication between the agents, and thus take the pheromone traces left by other agents into consideration when searching for local maxima. The objective function that will be encoded into the agents is hence:

$$z(\text{pixel}) = \omega_0 \, chk\text{grey}(\text{pixel}) + \omega_1 \, \text{pheromone}(\text{pixel}).$$

Setting $\omega_1 > 0$ will attract succeeding agents into choosing the same paths as the ones chosen by previous agents. This may create a sharper image, since the agents are more likely to choose the same paths instead of parallel ones. However, this also makes the results less deterministic, since the order in which the agent are deployed into the image will have significant impact on the final result.

Agent Movement

Incorporating knowledge about expected trends of a structure into the movements of an agent, enable the extraction of only interesting structures from the data, and hence limit the search for solutions. The movement of an agent is restricted by viewfields. A viewfield is a set of points defining the options an agent has for expanding its trace. The agents typically have two viewfields, one that is used for estimating the direction in which it should trace a ridge, and one defining its flexibility when performing the tracing. In the following subsections, it will be shown how these viewfields may be implemented for the 2D and the 3D method. First, how the fault properties are encoded into these viewfields will be described.

Fault Properties

Most faults can locally be approximated as planar surfaces. In practice, the fault surfaces do not always have a planar shape, but the shape of a higher order surface. This would be the case for a listric fault and often also for other faults due to deformation caused by intersecting faults. However, the aim of the current method is not that a single agent is able to track the whole surface, but only a small part of it. The method thus typically assumes that the local shape of a fault can be approximated by a plane. Combining the segments and therefrom approximating the full shape of the fault is the task of the surface merging part of the approach. The first thing that the agent will do after deployment is to estimate the orientation of the plane and expand in tangential directions to this initial estimate. One of the assumptions about the data is that the maxima ridges that will be extracted are not always well defined and continuous. For the agent to be able to follow such a ridge, it needs to be given some flexibility to deviate from the initial orientation estimate. For instance, the agent may be allowed to expand with an angle of ±15 degrees from the initial estimate. As discussed above, it is important that the agent is not allowed too much flexibility so that it won't easily loose track of the fault by being distracted by crossing faults or outliers.

The solution search can further be limited by constraining the allowed dip of the faults. Prior knowledge or inspection of the data may give indications on which dips to expect. For example, the geological history of an area may indicate normal faulting with dips steeper than 40 degrees from the horizon. Knowing this, there is no reason for extracting surfaces having a lower dip than this.

The fault properties discussed above can be summarized as consisting of the following three points:

The fault surface can locally be approximated by a plane.

The initial estimate can be limited by prior knowledge about the expected dips.

The agents should be allowed some deviation from the initial orientation estimate.

Additional constraints will be put on the surfaces by the stop criterion that will be discussed later.

Agent Movement in 2D Version

Figure 2:
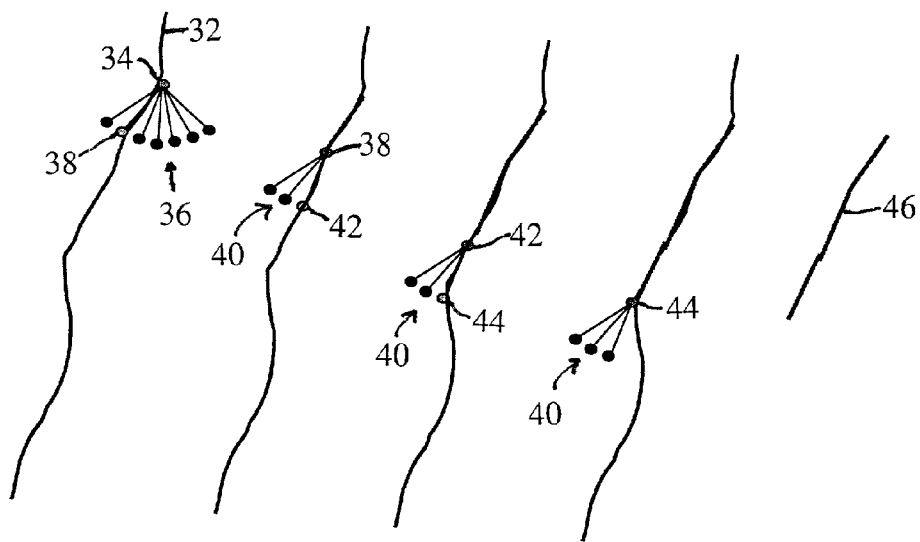
FIG. 2 illustrates the 2D fault tracing process.

For the 2D version, a first wider viewfield is typically used for finding the direction of the fault and a narrower tracing viewfield is typically used for extracting the fault segment. This is shown in FIG. 2. A fault 32 is extracted, first by placing an agent on an initial pixel 34. A relatively large viewfield 36 is used to select an additional pixel 38 that appears to lie on fault 32 (i.e. has the maximum objective function value). The relative positions of the initial pixel 34 and the additional pixel 38 can be used to calculate the apparent orientation of fault 32. If the selection of the additional pixel 38 is approved by the stop criterion, a relatively narrow tracing viewfield 40, that allows a limited degree of deviation from the apparent fault orientation, is calculated and used, in connection with additional pixel 38, to select a third pixel 42 appearing to lie on fault 32. The same tracing viewfield 40 is used in connection with the third pixel 42 to select a fourth pixel 44. As this process is repeated, when the tracing viewfield 40 is unable to select a further cell that appears to be located with fault 32, the selection termination criteria will satisfied and the cell selection process will terminate for this agent. Fault segment 46 represents the portion of fault 32 that was extracted by the inventive method by the agent beginning at initial pixel 34. These viewfields are very simple, and below a better method of direction estimation will be described when the 3D version of the method is described. The choice of R, the "step size", determines how well the fault is approximated, and should not be chosen too big. For typical seismic data, selecting R=3, has shown good results.

There are some limitations connected with observing 3D structures in 2D. In 2D, a plane will manifest itself as a line with a steep slope if the angle between its strike and the section is large, as a line with a slight slope if the angle is small, as a horizontal line if the strike is parallel with the section and the dip is non-vertical, and as a blur if the strike is parallel with the section and the dip is vertical. The 2D approach is only capable of handling the first case, if the second case is restricted to cases where the apparent dip is lower than the minimum allowed dip. In the other cases, the faults present in the data will only be perceived as disturbing elements. The 2D approach, in other words, has limitations on its ability to detect and extract faults, and will also be more prone to errors than will the 3D version, due to the increased level of disturbing elements.

Agent Movement in 3D

Figure 3A:
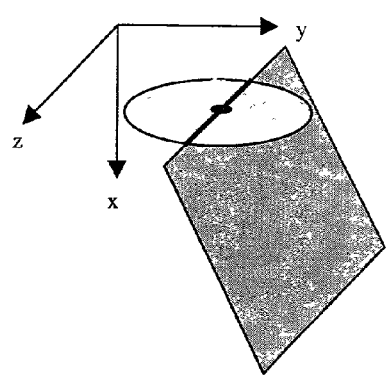
FIGS. 3(a) and 3(b) illustrate the process of finding the strike and dip of a fault.
Figure 3B:
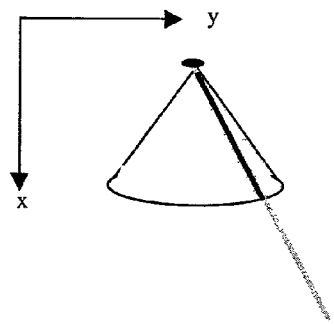

In 3D, all the above cases will be handled properly. That means that not only will the method estimate the dip of the fault, as in the dip estimation viewfield in the 2D approach, the method will also estimate its strike. In other words, two viewfields are needed for estimating the fault orientation. FIGS. 3(a) and 3(b) show how the 3D agent estimates the orientation of a fault. First, it estimates the strike of the fault by using the viewfield shown in FIG. 3(a). The strike is given by its angle to the y-axis in the yz-plane. It then estimates the dip of the fault by rotating the viewfield as shown in FIG. 3(b) so that it is perpendicular to the strike. The dip is perpendicular to the strike and is measured as the angle to the x-axis.

Getting a good orientation estimate of a fault surface in the attribute is often very hard. In order to get as good estimates as possible, viewfields with checkpoints located at several distances from the deployment point are often used, and the line with the largest average to be the tangent of the surface is chosen.

Figure 4A:
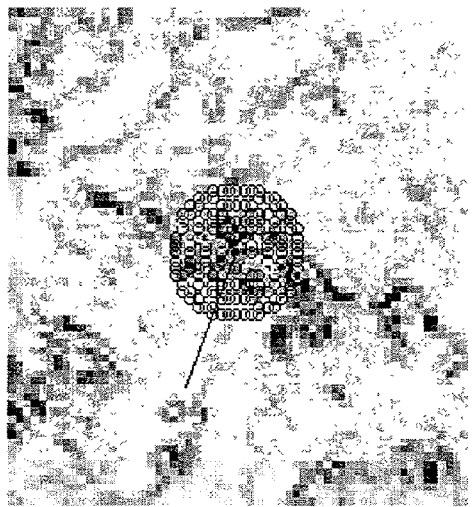
FIGS. 4(a) and 4(b) show the estimation of strike and dip for a fault using a viewfield consisting of checkpoints at 4 radii.
Figure 4B:
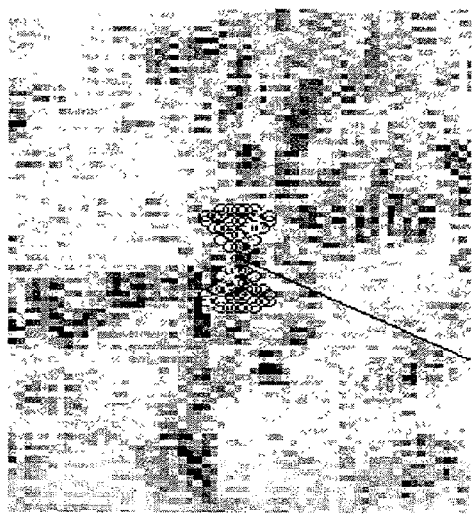

FIGS. 4(a) and 4(b) show an orientation estimate performed by an agent on a fault attribute. FIG. 4(a) shows the estimation of strike using a viewfield consisting of checkpoints at 4 radiuses. The estimate is taken as the line through the viewfield center whose average is largest. FIG. 4(b) shows a dip estimate acquired using a viewfield with 4 radiuses. Before utilizing the dip viewfield, it is rotated so that it will be perpendicular to the estimated strike. The solid lines are the normals of the estimated strike and dip.

Figure 5:
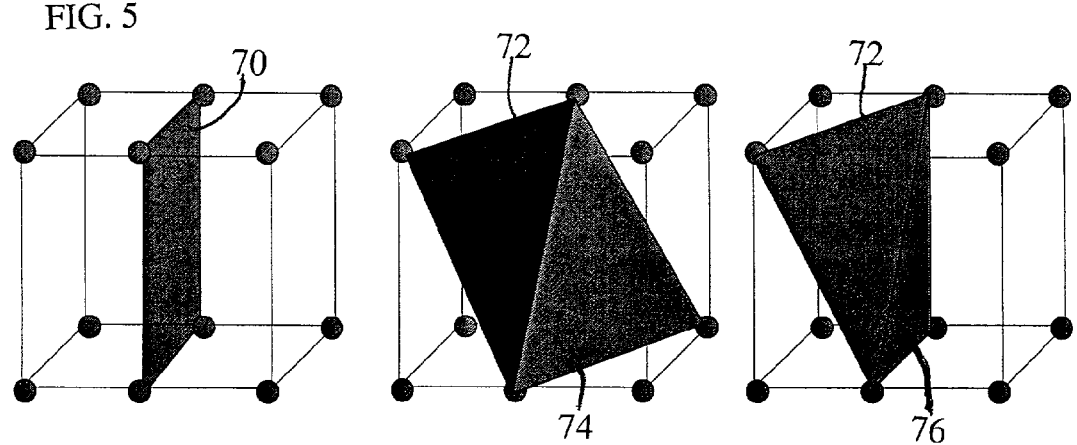
FIG. 5 illustrates the tracing viewfield for a 3D agent.

After the agent has made an orientation estimate, it is time to start tracking the surface. As usual, it is assumed that the fault can be locally approximated by a plane, and the tracking is performed by covering the surface with small planes. The tracing viewfield is shown in FIG. 5. Central Plane 70 is rotated to be in alignment with the estimated orientation of the feature being extracted. In each corner of this plane, a set of checkpoints have been assigned. Just like in the 2D version, these points define the expansion possibilities of the agent. In this case, these are the possible corners of the plane. In order to better estimate the surface, the plane is actually not a plane, but two triangles. First Triangle 72 and Second Triangle 74 and First Triangle 72 and Third Triangle 76 are examples of how two triangles can be combined to fit the fault surface. In this patent application, the surfaces defined by the tracing viewfield will be referred to as tiles.

Figure 6:
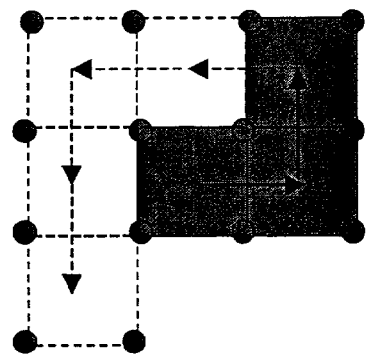
FIG. 6 shows a surface expanding spirally from an initial tile.

The agent traces the fault by expanding a surface as illustrated in FIG. 6. An initial tile is put down around the location of the orientation estimate, and the surface is expanded spirally from this tile. When laying a new tile, the tracing viewfield is translated so that its corners fit the corners of the previously laid tiles. These points will be fixed, while the remaining corners will have to be chosen as the maximum value of the checkpoints at each corner. The two tiles following the initial tile will in other words each have two corners where the maximum value will be chosen and checked with the acceptance criterion, whereas the third tile (and all other tiles along the edges having three fixed corners) will have only one corner which needs to be decided on. In order to connect the tiles from cycle to cycle, four lists of edge points are kept, one for each direction. The expansion is performed by depleting these lists in sequence, while adding new corner points to the other lists. This way, the expansion happens in a direction-wise manner, and further expansion in one direction will be stopped when the stop criterion for that edge of the surface is fulfilled.

Stop Criterion

Crucial to the success of the segmentation process is the choice of a good stop criterion. The task of the stop criterion is to ensure quality of the surface or line approximation by prohibiting the agents to continue expanding their trace after they loose track of the extreme ridge. However, the stop criterion will also have to take into consideration the difficult data the agent will be operating on, and thus allow them some slack.

When extracting extreme ridges, one obvious property that has to be checked for would be that the endpoints of the line in 2D or the corner points of the tiles in 3D are actually local maxima. However, when extracting fault surfaces from attributes like in the example shown in FIG. 9(a) and FIG. 4(a), this requirement is too strict. Due to the poorly defined surfaces in the data and the rigidity of the agents' tracing viewfields, each corner point will not always be a local maximum. In order to increase the agent's ability to trace the ridge, it is allowed to deviate from the local maximum by one or two pixels/voxels. This is illustrated for the 2D case in FIG. 7.

Figure 7:
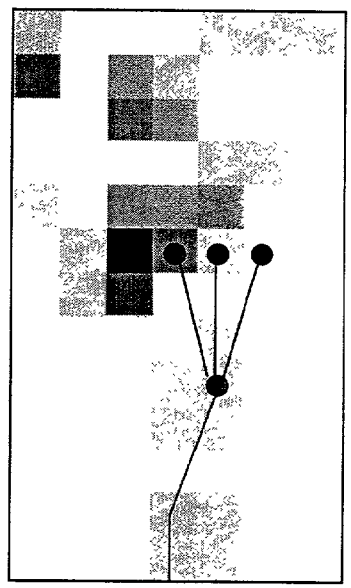
FIG. 7 shows a 2D agent following a weakly defined maxima ridge.

In FIG. 7, the 2D agent is following a weakly defined maxima ridge. The leftmost of the checkpoints has the largest value, but it is not a local maxima. If the agent is allowed to deviate one or two pixels from the maxima, the agent is able to continue following the ridge. Otherwise it will be terminated in the current position.

In 3D, there is not only a stop criterion on the corners of the tiles, but also on the edges of the surface that is being spanned by the agent. For fault surfaces, we are only interested in extracting solid, four cornered surfaces, not surfaces with more random shapes. If the surface is allowed to expand into narrow outgrowths, the surface becomes more prone to picking up random effects and inconsistent features. Insisting on having a clear maxima ridge along the entire edge provides robustness against such effects. The points along the surface edge are thus examined after each expansion cycle in that direction to determine if there appears to be a clear ridge along the edge. If not, further expansion is prohibited in that direction. Likewise when checking for local maxima, the exact surface is not expected to be visible at all points. The surface growing process is allowed some slack by allowing further expansion even though a few of the tiles along the edge have fulfilled the stop criterion. This can be done by defining a minimum percentage of tiles that have to be accepted, e.g. 80% of them. The expansion of each edge is typically treated independently.

It is not always desirable to stop the expansion of a surface even though the stop criterion is fulfilled. The underlying surface may not be visible across its whole extent, and in between the visible segments, and the stop criterion will be fulfilled. It would be desirable to promote surface expansion across these gaps, and thus connect the visible segments. Having estimated the orientation of the surface, it is likely that the agent will in fact be able to rediscover the ridge on the other side of the gap, if only it is allowed to continue its expansion. This may be allowed by assigning goodwill to the agent. For instance, the method may allow n illegal expansions in one direction, provided it is able to have m legal expansions afterwards. If this criterion is fulfilled, the illegal expansion is kept and the goodwill renewed. If not, the illegal expansion is deleted and further expansion in that direction is prohibited. The m consecutive accepted expansions are necessary to ensure that the agent is really on a ridge.

Segment Merging

This far, this patent application has discussed how the agents extract segments of the fault surfaces from the attribute. The final step in having explicit representations of the faults is to merge the surface segments into whole surfaces. The object-oriented design of the agents makes this task simpler. Overlapping surfaces that have approximately the same orientation are merged into one object. It is desired to keep crossing faults as separate objects, so in order to avoid merging the surfaces which intersect at a branching point, the deviation in the orientation cannot be allowed to be too big. The rigidity of the tracing viewfield doesn't make this a big problem. In order for two surfaces to have a significant overlap, the angle between them must be very low and hence rule out most crossing surfaces.

Merging surface segments that do not overlap and segments at points where the surface makes an abrupt change, is a more difficult task. Even though surface segments may not be physically connected, there may be a clear connection between some of the segments. It would be desirable to be able to connect these segments and fill in the gaps between them, so that the entire fault could be extracted as one surface. There are several ways this can be done, for example by using clustering techniques on the surface properties. As in the simple merging described above, information stored within the agent object can be used. The agent has information about orientation, value of attribute along the surface and position, but also other information could be inferred, e.g. offset of the fault along the surface by using correlation.

Another way this merging could be performed is by what is called competitive merging, which also relies on the object oriented and self-organized way of thinking. The idea behind this process is that each surface is responsible for its own growth, and includes surface segments in competition with other surface objects. The competitive merging process is outlined below.

For each segment, a surface object is created in which the segment is a member. The surface object has an internal evaluation function and a viewfield defining the volume in which a continuation of the surface is probable.

Within the viewfield, candidates are first found that may be included in the surface object. Candidates are chosen that to the largest degree contribute to raise the value of the evaluation function. The segments are kept as separate objects within the surface object.

If a surface wants to include a segment that already has been assigned to another surface, it can claim the segment from the other surface if the segment is more worth to it in terms of increased evaluation function value than for the other.

The surfaces are allowed to expand and exchange segments until equilibrium is reached, and no change occur. Limits on how the segments can be traded back and forth should be imposed to ensure convergence.

The surfaces are divided into categories according to their evaluation function, and plotted with different colors or grey levels to indicate their level of confidence. Small and uncertain surfaces will be deleted.

Figure 8:
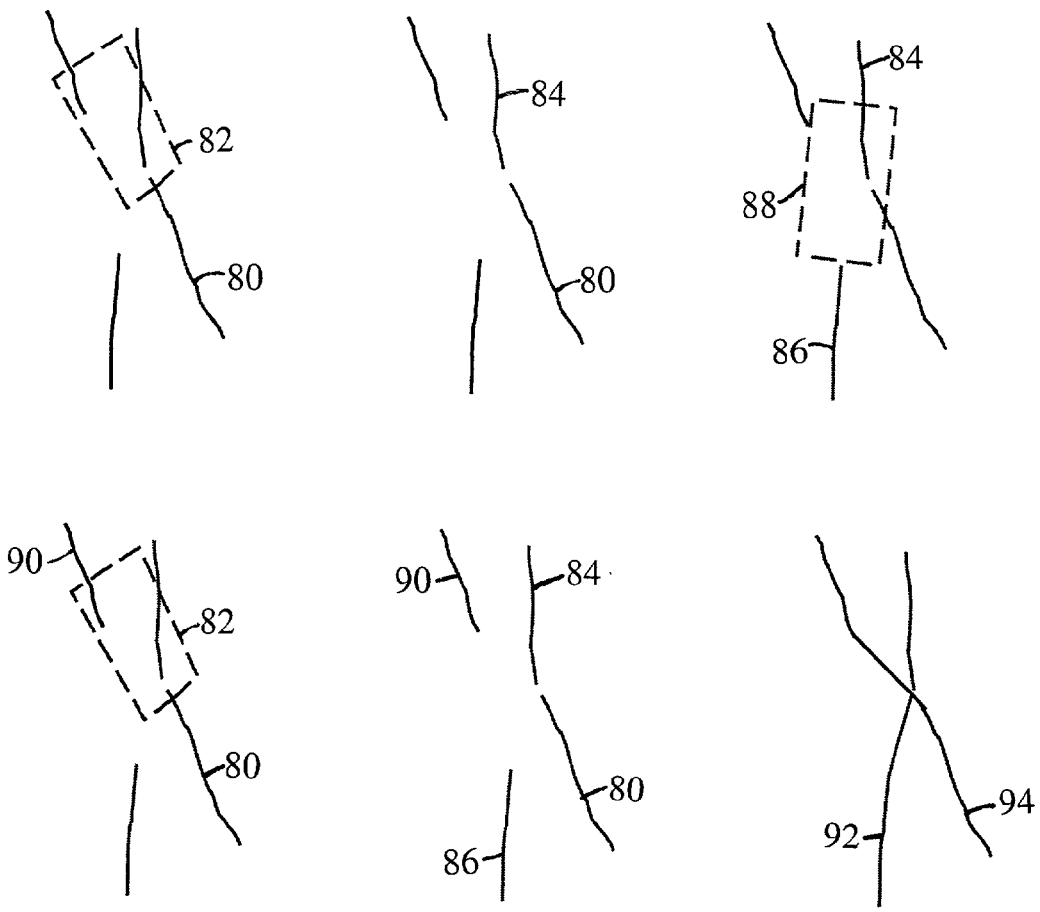
FIG. 8 shows the competitive merging process.

FIG. 8 shows an example of how this competitive merging process works. Lower Right Segment 80 looks for candidates to merge with using First Viewfield 82. Upper Right Segment 84 is chosen, and is assigned to the Lower Right Segment 80. The Lower Left Segment 86 utilizes Second Viewfield 88 and wishes to merge with Upper Right Segment 84. Lower Left Segment 86 has a higher evaluation profit from including the Upper Right Segment 84 than the Lower Right Segment 80, and the Lower Left Segment 86 claims the Upper Right Segment 84 from the Lower Right Segment 80. The Lower Right Segment 80 again uses the First Viewfield 82 and now merges with the Upper Left Segment 90. Lower Left Segment 86 is now merged into a single feature with Upper Right Segment 84 and Lower Right Segment 80 is now merged with the Upper Left Segment 90 into a separate feature. The gaps between the merged segments are then filled in to produce a First Merged Feature 92 and a Second Merged Feature 94.

Results

Figure 9C:
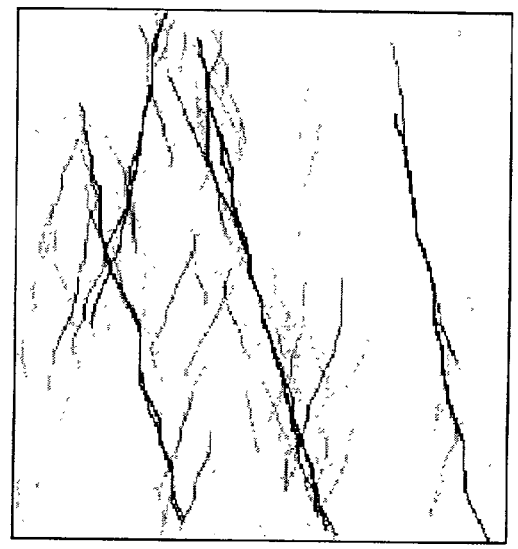

Deploying 3000 agents in the 250×250 2D attribute section shown in FIG. 9(*b*) yields the image shown in FIG. 9(*c*). As can be seen, the stronger faults have been extracted, and as well as several of the more subtle faults.

Figure 10A:
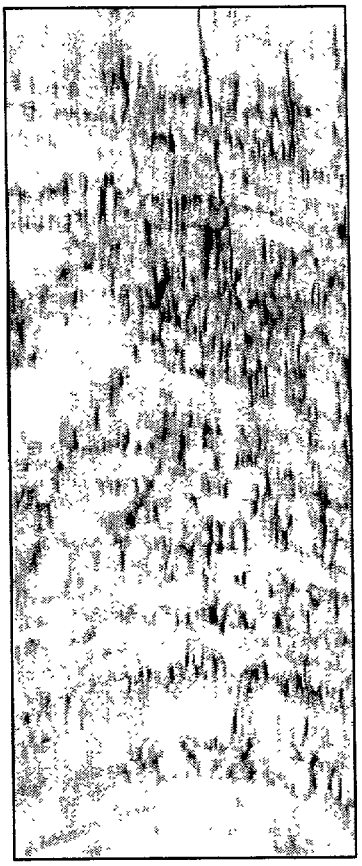
FIGS. 10(a) and 10(b) show a section from an input 3D seismic data volume and faults that have been extracted from the input volume by the inventive method.
Figure 10B:
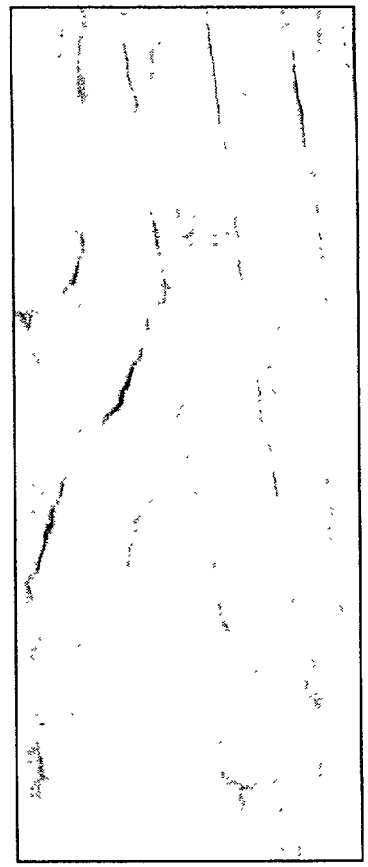

An example 625×250 input attribute section extracted from a 3D attribute cube is shown in FIG. 10(*a*). FIG. 10(*b*) shows the equivalent section after the faults have been extracted using the inventive 3D methodology. It can be seen that the attribute section contains a great deal of noise that has been removed in the extracted result.

For exploration purposes, it is often desired to display only the major faults, just to get an impression of the large-scale geology of the area of interest. The inventive method is capable of applying the 3D approach to an attribute which captures strong faults, but which is not very detailed. By removing weak surfaces and vertical components, a clean result that displays only the major faults may be obtained.

Other Applications

This patent application has, so far, concentrated on describing the methodology as a specialized approach where prior knowledge of the desired structures is required. This is necessary when it is desired to extract structures as separate objects or structures from data with other undesired structures. If this is not the case, the approach can be used as a general line or surface extraction algorithm by using in 2D a circular, or in 3D a spherical tracing viewfield. In other words, the algorithm can be used for all traditional line and surface extraction applications. The strength of this approach compared to other approaches is; however, that knowledge can easily be incorporated into it. Other applications in which the inventive method may also be successfully be utilized is described below.

Horizon Extraction

Figure 11A:
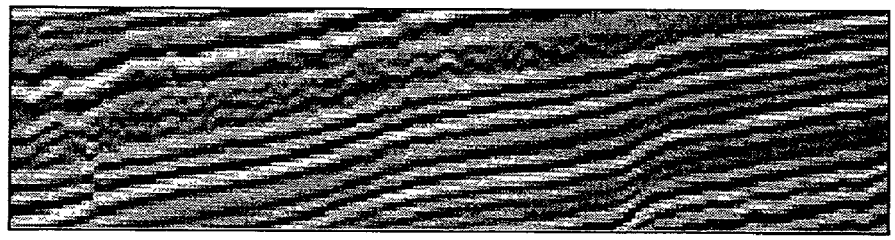
FIGS. 11(a) and 11(b) show an input 2D seismic section and geologic horizons that have been extracted from the seismic section by the inventive method.
Figure 11B:
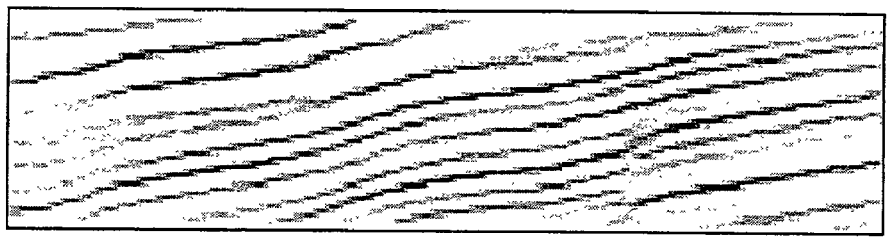

FIG. 11(*a*) shows an example seismic section. These horizontal layers were created at different time periods in the geological history. These layers may e.g. contain source rock or reservoir rock. It is interesting to extract these horizons, and tools for doing this exist. However, these tools have some difficulties that may be overcome using the inventive method. Existing tools typically start extracting the horizon from a seed point, using some objective function that tells which of the neighboring points are members of the horizon. If the horizon becomes invisible for some period, the tracker is incapable of following the horizon, and a hole is created in the extracted surface. The use of swarm intelligence in the inventive method may reduce this problem. The inventive method can extract surfaces by locking on to a horizon from a large number of seed points, also within the hole, and push them across regions of low signal. Overlapping surfaces will then be merged, based on their local orientation and properties. Using competitive merging, as described above, enables the extraction of the horizon across faults as well, something which prior art horizon trackers are typically not capable of. Geologic horizons extracted by the inventive method are displayed in FIG. 11(*b*). This result was obtained by simply rotating the seismic section shown in FIG. 11(*a*) by 90 degrees and then applying the fault extraction method discussed above to the rotated data.

Skull Extraction from MRI and CT Data

In medicine, imaging of the brain is mainly performed by magnetic resonance imaging (MRI) and computed tomography (CT). These two techniques have different strengths in detecting features in the brain; hence it is often desirable to combine the two results into one image. In order to do this; the results need to be aligned in a procedure that is called "referencing". A natural choice as a reference is the skull. Extraction of the skull as a desired feature using the inventive method will enable the two results to be automatically resized and aligned into one image.

Stereo Net Editing/Filtering

The extracted features can also be edited or filtered, such as through the use of a stereo net editing/filtering process. A stereo net is a projection method that is used by geologists to visualize the orientations of faults and horizons. A stereo net is a projection of a half sphere onto a plane and can be thought of as looking down onto a ball that has been cut in half. Normals to the displayed surfaces are given in spherical coordinates, i.e. each normal vector is described by a dip and an azimuth value. A vector is plotted on the net as the projection of the point where the vector, starting from the center, would meet the sphere. For example, a horizontal plane would have a vertical normal that would meet the sphere at its lowest point, and hence is plotted in the center of the net. A vertical plane would have a horizontal normal which would be plotted somewhere along the perimeter of the net, depending on the azimuthal orientation of the plane. The azimuth is measured along the perimeter (0–360 degrees), and dip (−90–+90 degrees) as the distance from the center of the net.

Faults often appear in systems, that is, they are more or less parallel (i.e. they have roughly the same dip and azimuth values). On a stereo net, a fault system can often be seen as a high-density cluster around the systems orientation. Also, coherent noise will often appear as a cluster in the net. In FIG. 13, a set of extracted faults have been projected on a stereo net and they can be seen as dense clusters. This process is quite straightforward using the inventive method because during the feature extraction process, the agents will typically have made an orientation estimate of the surfaces they have extracted. This estimate is kept with the surfaces, and projecting the surface normals onto a stereo net can provide valuable insight for geologic interpretation and can be used to edit or filter the extracted features. The surfaces will also have some properties attached to them. Displaying these properties on the stereo net according to surface orientations will give the interpreter an impression of the properties of fault systems. For example, displaying the average of the sizes of the surfaces plotted at each orientation can indicate which fault systems consist of large, main faults, and which consist of smaller, secondary faults. Displaying confidence measures (like the pheromone amplitude, the average objective function value or the value of the input attribute along the surface) as function of orientation will indicate the confidence of fault systems.

By interactively marking regions on the net, for instance, an interpreter can decide which surface orientations are to be displayed and which are to be hidden from the results. For example, if the interpreter thinks that surfaces having a particular orientation are due to processing errors, they can simply mark the cluster corresponding to these surfaces on the stereo net and remove them from the displayed results. Similarly, they can split the result into separate systems and study them separately. Being able to split fault systems has a particular application when studying a cube in 2D. Fault surfaces parallel to the slicing of the cube will often blur the image as shown in FIG. 14(a), masking desired feature details. By hiding these surfaces, the blurring is removed, resulting in a cleaner image and the faults extending into the volume can be studied in more detail, as shown in FIG. 14(b). Vertical striping is often a processing effect and it can also be removed using this process. The vertical features between the two leftmost faults in FIG. 14(a) and (b) may be processing artifacts, and they may be removed, as shown in FIG. 14(c). Other properties associated with the extracted surfaces can also be displayed on the stereo net. This will give an indication on how the properties are related to orientation. As we have seen, the stereo net editing/filtering process can be used to interactively browse and make selections among the features that have been automatically extracted using the inventive method.

The stereo net projection procedure described above is used to plot poles of vectors having 3 dimensions. A 2D version of the stereo net technique can also be used, which consists of a single line where the dips are plotted so that the center of the line would be 0 degrees (vertical), and the endpoints of the line would be −90 and +90 degrees.

Computer Implementation

Figure 12:
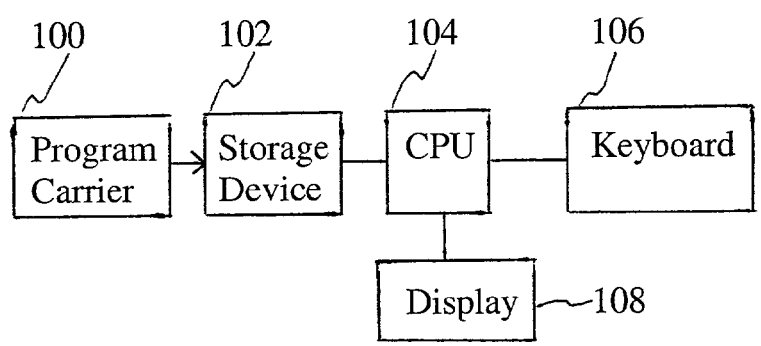
FIG. 12 shows a schematic representation of a computer system and computer program product associated with the implementation of the inventive method.

The inventive method will typically be implemented on a computer system of the type shown in schematic format in FIG. 12. The steps of the inventive method are translated into computer readable program code means and are recorded on a computer usable medium, such as Program Carrier 100, to produce a computer program product for extracting desired features from a cellular image. This computer usable medium may consist of magnetic or optical recording media, such as floppy disks, hard drives, flash memory, CD-ROMs, or magnetic tapes. The contents of the computer program product are typically loaded onto a Storage Device 102 attached to a CPU 104 that executes the computer program recorded on the computer usable medium. The computer program may be loaded onto the Storage Device 102 either by placing the Program Carrier 100 into a reading device connected to the CPU 104 or by downloading the computer program using a network, such as a local area network or the Internet. When equipped with an operator input device (such as a Keyboard 106) and an output device (such as Display 108), the computer system shown in FIG. 12 is capable of extracting desired features from a cellular image according to the inventive method described above.

The foregoing descriptions of preferred and alternate embodiments of the present invention have been presented for purposes of illustration and description. They are not intended to be exhaustive or to limit the invention to the precise examples described. Many modifications and variations will be apparent to those skilled in the art. These embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the accompanying claims and their equivalents.

The invention claimed is:

1. A method of extracting desired features from a cellular image using a plurality of agents starting from one or more starting points comprising the steps of:
    (a) Selecting an initial cell within said image;
    (b) Selecting an additional cell, near said initial cell, appearing to be associated with a desired feature;
    (c) Repeating step (b) for further cells, near at least one of said previously selected cells, appearing to be associated with said feature, until selection termination criteria are satisfied; and
    (d) Repeating steps (a) through (c) for other initial cells;
    wherein selection of a cell in step (b) updates an "electronic pheromone" value associated with said cell, wherein said electronic pheromone is associated with one or more of said plurality of agents.

2. A method according to claim 1, wherein said image is a 2D image and said cells are pixels.

3. A method according to claim 1, wherein said image is a 3D image and said cells are voxels.

4. A method according to claim 1, wherein said image is relatively noisy and said features are relatively weakly defined.

5. A method according to claim 1, wherein a plurality of said features intersect and are extracted from said image as different objects.

6. A method according to claim 1, wherein data used to create said cellular image has been pre-processed to enhance said desired features in said cellular image.

7. A method according to claim 1, wherein said initial cells are selected in step (a) by subdividing said cellular image into blocks and selecting cells within said blocks having maximum values of an objective function.

8. A method according to claim 1, wherein an apparent orientation of said feature is determined after said initial cell is selected in step (a) and prior to the selection of an additional cell in step (b).

9. A method according to claim 8, wherein the apparent orientation is limited to expected orientation values.

10. A method according to claim 8, wherein a viewfield is established to narrow the candidate cells for selection in step (b), said viewfield being aligned with said determined apparent orientation of said feature.

11. A method according to claim 1, wherein said further cells are located within a tracing viewfield associated with at least one of said previously selected cells.

12. A method according to claim 1, wherein the selection of cells in step (c) is positively influenced by the previous selection of said cells during previous iterations of step (c).

13. A method according to claim 1, wherein segments of said features are extracted and at least some of said segments are then merged.

14. A method according to claim 13, wherein said segments are merged if they meet expected feature characteristics.

15. A method according to claim 13, wherein said segments are merged by a competitive merging process.

16. A method according to claim 1, wherein measures of confidence are associated with said extracted features.

17. A method according to claim 16, wherein said measures of confidence increase if magnitudes of "pheromone" values associated with cells comprising said features increase.

18. A method according to claim 16, wherein said measures of confidence increase if average function values across said features increase.

19. A method according to claim 16, wherein said measures of confidence increase if the number of cells comprising said features increase.

20. A method according to claim 16, wherein said measures of confidence increase if variances of local properties of merged segments comprising said features decrease.

21. A method according to claim 1, wherein said cellular image is derived from one of seismic data, magnetic resonance imaging data, and computed tomography data.

22. A method according to claim 1, wherein said desired features comprise faults.

23. A method according to claim 1, wherein said desired features comprise geologic horizons.

24. A method according to claim 1, further comprising the step of displaying the orientations of said features.

25. A method according to claim 24, wherein said orientations of said features are displayed on a stereo net.

26. A method according to claim 24, wherein properties of or confidence measures associated with said features are displayed on a stereo net according to the orientations of said features.

27. A method according to claim 24, further including the step of allowing an interpreter to interactively edit or filter said features using said displayed orientations.

28. A computer system for extracting desired features from a cellular image using a plurality of agents starting from one or more starting points, comprising:
  (a) means for selecting an initial cell within said image;
  (b) means for selecting an additional cell, near said initial cell, appearing to be associated with a desired feature;
  (c) means for selecting further cells, near at least one of said previously selected cells, appearing to be associated with said feature, until selection termination criteria are satisfied; and
  (d) means for selecting other initial cells, additional cells, and further cells using said means for selecting an initial cell, said means for selecting an additional cell, and said means for selecting further cells;
  wherein selection of a cell by said means for selecting further cells updates an "electronic pheromone" value associated with said selected cell, wherein said electronic pheromone is associated with one or more of said plurality of agents.

29. A computer program product for extracting desired features from a cellular image using a plurality of agents starting from one or more starting points, said computer program product comprising:
  a computer readable medium having computer readable program code embodied in said medium for extracting desired features from a cellular image, said computer program product having:
    (a) computer readable program code means for selecting an initial cell within said image;
    (b) computer readable program code means for selecting an additional cell, near said initial cell, appearing to be associated with a desired feature;
    (c) computer readable program code means for selecting further cells, near at least one of said previously selected cells, appearing to be associated with said feature, until selection termination criteria are satisfied; and
    (d) computer readable program code means for selecting other initial cells, additional cells, and further cells using said computer readable program code means for selecting an initial cell, said computer readable program code means for selecting an additional cell, and said computer readable program code means for selecting further cells;
  and wherein said computer readable medium further includes computer readable program code means for updating "electronic pheromone" values associated with cells selected by said computer readable program code means for selecting further cells, wherein said electronic pheromone is associated with one or more of said plurality of agents.

* * * * *